Dec. 14, 1965  V. CABONI  3,222,903

DEVICE TO BE ADDED TO A LATHE, FOR SPINNING

Filed April 22, 1963  2 Sheets-Sheet 1

INVENTOR.

BY Vittorio Caboni

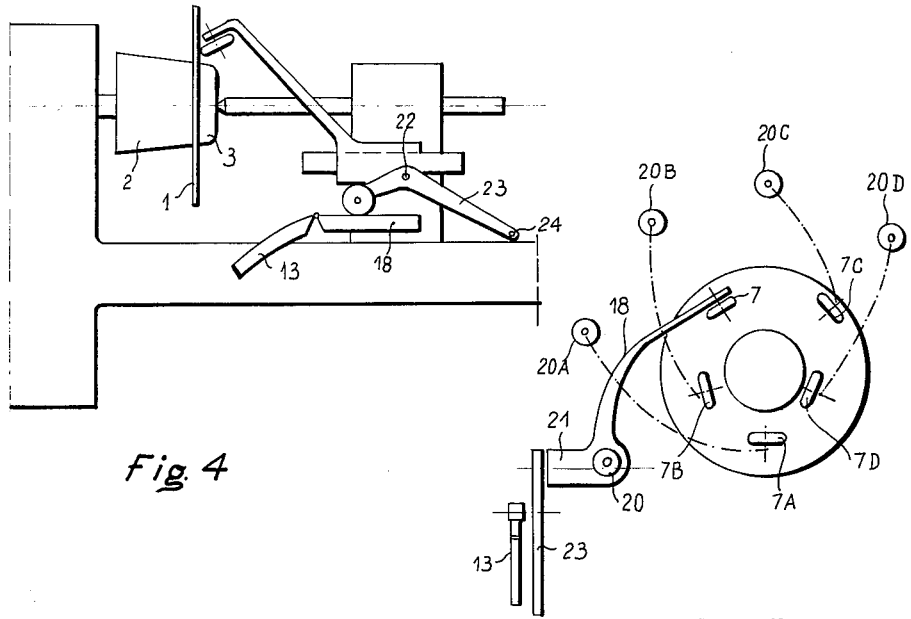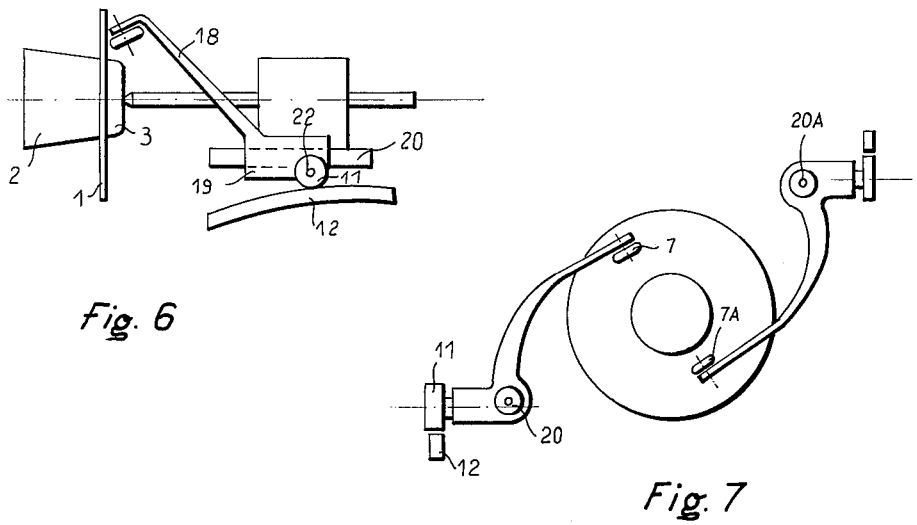

United States Patent Office 3,222,903
Patented Dec. 14, 1965

3,222,903
DEVICE TO BE ADDED TO A LATHE, FOR SPINNING
Vittorio Caboni, % Ing. P. Guazzo, Via XX Settembre 74, Turin, Italy
Filed Apr. 22, 1963, Ser. No. 275,191
3 Claims. (Cl. 72—81)

The object of this invention is a device to be applied to a lathe, during spinning.

For this type of work a metal disc is used (i.e. brass, aluminum etc.) which is held between a support and the die and is rotated at a relatively high speed, while at the same time pressure is applied against the disc, by the end of a rod formed tool, which is resting against a pivot, clamped to the base of the lathe and the other end of which is operated by the worker.

This operation done manually is slow and tiring and moreover the quality of the production depends very much on the skill of the worker, acquired through a long period of training. While with the use of this invention, a device is obtained for mounting on the lathe and which allows the operation to be done in a morer apid and economic way, without the application of a great deal of force on the side of the operator, who acquires the necessary skill in a short time.

The device is substantially composed of a carriage that can be moved on the longitudinal direction of the lathe and that carries a rod. One end of this rod carries a tool which shapes the spinning disc obliging it to follow the form of the die, while the opposite end is operated by the worker who, through an angular lever, one arm of which has a small wheel that slides along a cam, compels the end of this rod to follow a fixed path, corresponding to the deformation to be impressed on the disc.

Preferably the tool consists of a round body, pivoted at its centerline and free to rotate on it.

In an embodiment of the invention said rod which carries the tool is operated automatically, for instance by means of a coupling comprising a screw and a nut which constitutes said carriage, and its path is defined solely by the contact of a roller with a cam.

In another embodiment there are many tools which work simultaneously on the same disc, and are guided by cams, while one of said tool may be at the same time under the action of the operator.

It has been found advantageous that the guide cam is composed of several portions, the relative position of which may be changed so as to change the resultant shape of the guide surface in the different steps of the work.

Generally it suffices to have the cam made of only two portions, one of which is fixed on its movable carriage, and the second is movable with respect to the said first portion, for instance being rotatably mounted on a pivot.

Other particulars and characteristics of the invention will become evident after the following description, which refers to the enclosed drawing, where:

FIG. 4 is the corresponding elevation.

FIG. 5 is a profile view of the same device, with the possible addition of several tool carrying arms, FIG. 6 is a diagrammatical elevation concerning a third embodiment, and FIG. 7 shows a modification, in which the device has two arms operating automatically.

Figure 1:
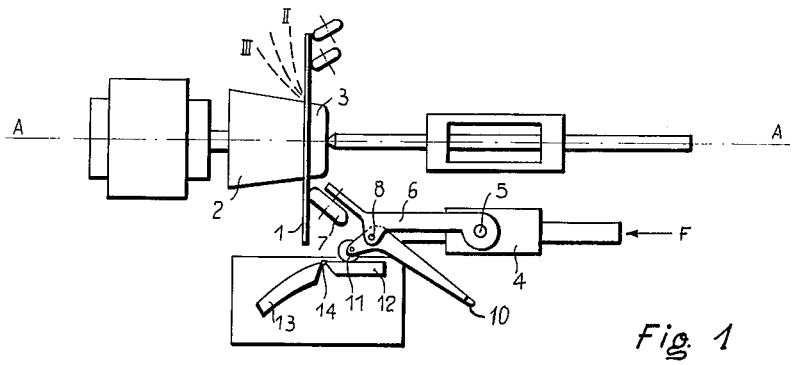
FIG. 1 is a schematic plan view of some parts of the lathe (not shown) to which this device has been applied, in a preferred embodiment, which is only used as an example.

As it can be seen on the drawing (FIG. 1 and 2), disc 1 is fixed on the centerline A—A of a lathe for the working of plate. This disc is held between the bottom of the die 2 and the counter-die 3. The carriage 4 can slide back and forward in the longitudinal direction of the lathe, as shown by arrow (F) (preferably inclined with respect to the centerline A—A of the lathe) and carries a pivot pin shown as 5 for an arm 6 which carries on one end the tool 7 and in an intermediate spot carries the pivot pin 8 for an angular lever 9 one arm of which is provided with a handle (not shown) at its terminus 10 and the other arm has the roll 11 free to rotate and contacting the cam.

This cam in the case shown includes the straight section 12 and a second section 13 pivoted on the first at 14, that can rotate on said pin and be stopped in the selected position, relative to carriage 15 also sliding according to a required direction.

Figure 2:
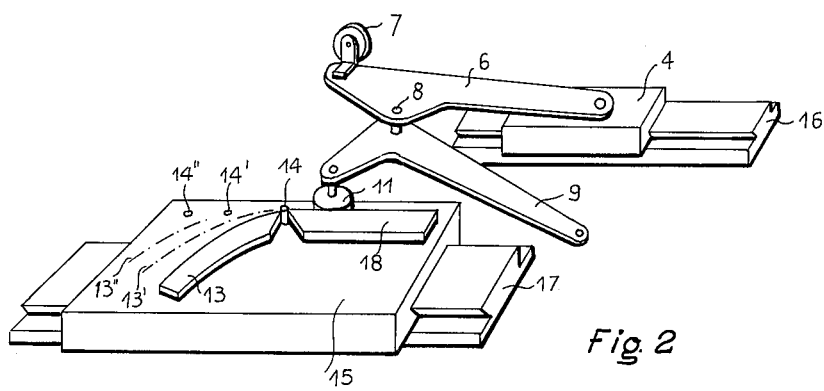
FIG. 2 is a schematic perspective view of the same device.

In FIGURE 2, the form of construction of the device described in the invention is clearer and the sliding guides 16 of carriage 4 and 17 of carriage 15 are also shown.

The operation of the device corresponding to a first embodiment of the invention is as follows:

Having placed disc 1 and started the rotation of the lathe, the two carriages 4 and 15 are carried to the end of their stroke on the right, then acting on lever 9 and moving carriage 4, the tool 7 advances with a combined movement toward centerline A—A and disc 1, until it contacts the latter near the center. The pressure applied on terminus 10, strongly amplified by the angular lever 9 is transmitted to tool 7 which presses against disc 1 and deforms it into a concave form more and more closed.

Tool 7 follows this deformation, always keeping in contact with the disc 1 and its stroke depending upon the travel of roll 11, which is pushed towards the left, contacting the working edge of curved cam 12 and 13. The disc begins to take the form shown as II.

When the operator realises that he cannot exert any extra force on the lever 9 as the tool follows simply the deformation that the disc has already undergone, he moves cam 13 into the position 13' (FIG. 2) and fixes it in this position (by means of a pin or clamp not shown). Afterwards, roll 11, following path 13", compels the tool 7 to advance even farther than before, according to the form of the cam. After this deformation has taken place, the worker moves towards the left the carriage 15 and the articulation 14 is placed by choice in the other points 14' 14" 14''', etc., corresponding to which the profile 13 will move for instance in 13''' and the operation continues until the disc 1 takes the profile III and finally adapts itself to die 2, taking its definite form.

The articulated system formed by the arm 6 and lever 9 insures the foreseen connection between the movements of roll 11 and of tool 7.

It is evident that this invention can be realized in many other ways, always having a point that effectuates a movement on a fixed path and a system of transmission that transmits the movement of this point to the tool having the function of deforming the plate, or sheet.

Figure 3:
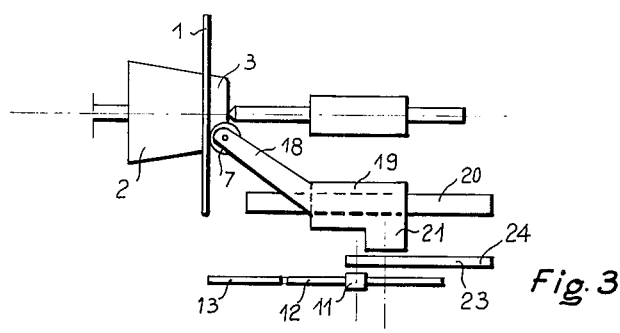
FIG. 3 represents the plan view of a device according to the invention, in a second embodiment.

In particular, the device can have the shape given by way of example in FIGURES 3, 4 and 5.

In this case the tool 7 is carried by an arm 18 fixed to a nut 19 engaging with a screw 20.

Nut 19 presents a lateral expansion 21 which carries a pivot 22 on which is rotatably mounted a lever 23 having on one end a handle 24 and on the other end a roller 11.

As it has been shown schematically on the same FIG. 5, it is also possible, according to the invention, to have a plurality of screws 20A, 20B, 20C, 20D operating on arms each of which carries a tool 7A, 7B, 7C, 7D.

The mode of operation of the device shown in FIGURES 3–5 is similar to that of the device given by FIGURES 1–2. The guides 16 of FIGURE 2 are replaced by a screw 20 and the carriage 4 by the nut 19. In the former case, carriage 4 slides on guides 16, while in the latter case the rotation of screw 20 causes the nut 19 to advance. The rotation of the screw is effected by suitable conventional means. The translational movement of the nut 19 is again planar as in the case of carriage 4.

At the same time roller 11 is moved contacting cam 12, 13 and compels tool 7 to move from the centre toward the periphery of the disc. This movement of the tool in a radial direction with respect to the disc may be accentuated or reduced by the operator's action, who can move in either direction terminus 24 of lever 23.

Referring now to FIGS. 6 and 7, a simplified embodiment of the device according to the invention is shown, which can work automatically. In this case, which in many points is very similar to the preceding one, nut 19 carries a pin 22 for a roller 11 which moves directly on the cam 12.

In this case also (FIG. 7) there is the possibility of mounting many tools 7, 7A, etc. each of which is driven by its screw 20, 20A, etc. Preferably these tools are arranged in such a way as to begin working at a different distance from the centerline and the driving screws moves them with a different rate of speed.

Particularly in the case of thin sheets this device gives the possibility to carry out a very quick work.

In the embodiments of the invention in which the intervention of the operator is foreseen for each pass of the tool, it is advantageous that the movements of the carriage 4 carrying arm 6 be controlled by an electric reversible motor, having two control switches, for forward and backward movement respectively, placed at terminus 10 of lever 9.

This invention has been described and shown with reference to some preferred embodiments, given solely by way of example, but it will be appreciated that other structures are possible, without departing from the scope of the invention.

What is claimed is:

1. A device adapted to be supported by a lathe for controlling the working movement of a spinning tool comprising: a longitudinal first guiding means having a sliding carriage thereon; a supporting arm for mounting a spinning tool at one end thereof and connected pivotably at the other end to said carriage; a lever having two arm portions and a fulcrum point located between said arm portions, said fulcrum point defining a pivotal connection means for pivotably joining said lever and said supporting arm; a rotating follower mounted on one of said two arm portions; a second guiding means parallel to said first guiding means and having a carriage sliding thereon; and a guide pattern mounted on the carriage of said second guiding means and adapted to be engaged by said follower, whereby movement of the opposite arm of said lever by an operator effects angular displacement of said follower-mounting arm.

2. A device according to claim 1 wherein said guide pattern includes a straight portion and a curved portion, said curved portion being pivotable on said straight portion and able to be positioned in a number of working positions.

3. A device according to claim 1 wherein said first guiding means is a rotating endless screw and said carriage thereon is a threadable nut.

References Cited by the Examiner

UNITED STATES PATENTS

| | | | |
|---|---|---|---|
| 291,253 | 1/1884 | Williams | 113—52 |
| 1,540,801 | 6/1925 | O'Neel | 113—53 |
| 1,922,087 | 8/1933 | Hiester | 113—52 |

CHARLES W. LANHAM, *Primary Examiner.*